United States Patent [19]

Lauer

[11] Patent Number: 4,690,600
[45] Date of Patent: Sep. 1, 1987

[54] THREADED CONNECTION HAVING MULTI-PART THREADED BOLT

[75] Inventor: Fredy Lauer, Rickenbach-Attikon, Fed. Rep. of Germany

[73] Assignee: Sulzer Brothers Limited, Winterthur, Switzerland

[21] Appl. No.: 866,212

[22] Filed: May 22, 1986

[30] Foreign Application Priority Data

May 30, 1985 [CH] Switzerland ............ 02286/85

[51] Int. Cl.⁴ ............ F16B 39/28; F16B 39/22
[52] U.S. Cl. .................... 411/263; 411/272; 411/312
[58] Field of Search ........... 411/263, 264, 300, 312, 411/307, 271, 272, 259, 383, 384, 198, 202, 924, 925

[56] References Cited

U.S. PATENT DOCUMENTS

| 994,528 | 6/1911 | May | 411/272 |
| 1,728,758 | 9/1929 | Hayd | 411/300 |
| 3,245,142 | 4/1966 | Williams | 411/259 |
| 4,252,167 | 2/1981 | Dessouroux | 411/312 |

FOREIGN PATENT DOCUMENTS

| 15777 | of 1909 | United Kingdom | 411/271 |
| 2066401 | 7/1981 | United Kingdom | 411/383 |

Primary Examiner—Gary L. Smith
Assistant Examiner—Neill Wilson
Attorney, Agent, or Firm—Kenyon & Kenyon

[57] ABSTRACT

The threaded connection is formed between a tapped component and an externally threaded two part bolt. The two bolt parts are each provided with an external thread of the same pitch and hand in order to be threaded simultaneously into the tapped component. One bolt part is also provided with an extension which is threaded into the other bolt part via a screw thread which has an opposite hand or pitch to the external screw threads. When the two bolt part are threaded into the tapped component, the screw threaded extension prevents unthreading of one bolt part relative to the other.

6 Claims, 8 Drawing Figures

THREADED CONNECTION HAVING MULTI-PART THREADED BOLT

This invention relates to a threaded connection. More particularly, this invention relates to a threaded bolt.

Heretofore, various types of connections have been known, wherein an externally threaded bolt is threaded into a correspondingly tapped component, for example, for use as centering bolts for nuclear fuel elements. It has also been known, in threaded connections of this kind, that it is necessary to prevent accidental release of the threaded-together members. One manner of preventing such a release is to extend the bolt screwthreading and to thread a lock-nut or back-nut onto the bolt which can then be tightened against the tapped component. If the component itself is a nut, release of the connection can be pervented by placing a securing element, such as a spring washer or serrated washer below the nut. The assumption, in all cases, is that the threaded connection is accessible from the rear. However, in many cases, access may not be available to the rear of a threaded connection. In these cases, the familiar types of lock-nuts, back-nuts and securing elements cannot be readily used.

Accordingly, it is an object of the invention to reduce the risk of an accidental release of a threaded connection even though the connection is not accessible from the rear.

It is another object of the invention to provide a threaded connection which is constructed to prevent an accidental release.

It is another object of the invention to provide a bolt of relatively simple construction which incorporates a means to prevent accidental unthreading Briefly, the invention provides a threaded connection which is comprised of a tapped component and a bolt which is formed of a pair of externally threaded parts. In addition, the bolt includes a screwthread which threadably connects the two bolt parts for relative rotation as well as means, such as a spring, between the two parts to permit relative movement there between whereby during threading of the bolt into the tapped component, the two bolt parts move together, i.e. rotate together to permit continuous threading, while in response to unthreading of the bolt from the tapped component, the two parts move relative to each other so as to prevent removal of the bolt from the tapped component. The bolt is constructed so as to be readily threaded into the tapping of the tapped component since the two bolt parts take up a position relative to each other to form a continuous external screwthread. However, when the bolt is being unthreaded, the bolt parts move separately, plus causing a discontinuity in the external screwthread, by which the bolt is locked in the tapped component. Hence, further turning of the bolt to unthread the bolt is inhibited. As a result, an automatic securing against an accidental release of the connection is achieved.

The threaded connection simplifies the fitting of the bolt considerably since the bolt merely has to be screwed in without any need to have additional securing elements kept available during assembly. The threaded connection is of use not only for the centering bolts of nuclear fuel elements but also for adjusting purposes, for example, for the leveling of balances, and for positioning purposes, for example the setting up of articles for machining in or on machine tools.

The bolt may be constructed so that the screwthread which connects the bolt parts is of opposite hand to the external thread of the two parts. Alternatively, the screwthread may have a different pitch from the external threads of the bolt parts.

In another enbodiment, the bolt may be constructed so that one of the bolt parts has a longitudinally disposed bore having an internal screwthread therein while the other part has a screwthread extension threaded into the bore and a torsion bar which extends to the end of the bore for connection to the first part, for example by way of a toothing.

These and other objects and advantages of the invention will become more apparent from the following detailed description taken in conjunction with the accompanying drawings wherein.

Figure 1:
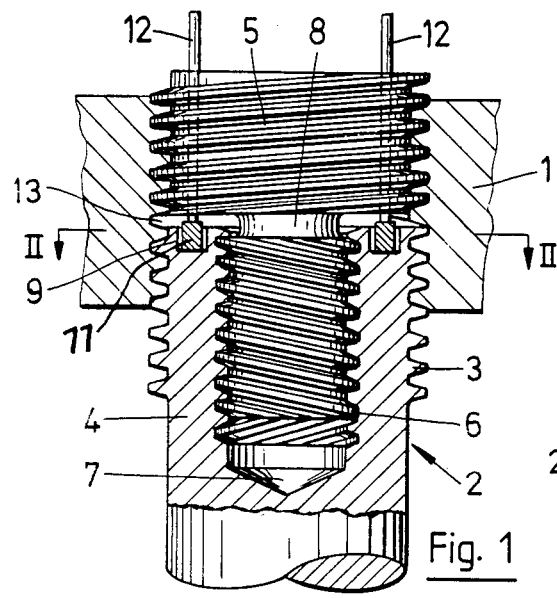
FIG. 1 illustrates an axial sectional view through a threaded connection constructed in accordance with the invention.

Referring to FIG. 1, the threaded connection is composed of a tapped component 1 and a bolt 2 which is threaded into the tapped component 1. As indicated, the bolt 2 is formed of a pair of externally threaded parts 4, 5, each of which is provided with an external threaded 3 of equal pitch and equal hand. Further, the external screw threads 3 are sized for threading into the tapped component 1.

The bolt 2 also has a further screwthread 6 which threadably connects the parts 4, 5 together so as to permit relative movement therebetween. As indicated, the lower bolt part 4 is formed with a tapped longitudinal bore 7 while the upper bolt part 5 is formed with an extension 8 having the screwthread 6 thereon for threading into the tapped bore 7. In this case, the screwthread 6 is of opposite hand to the external threads 3 of the bolt, i.e. the screwthreads 3 are right-handed and the screwthread 6 is left-handed.

Figure 2:
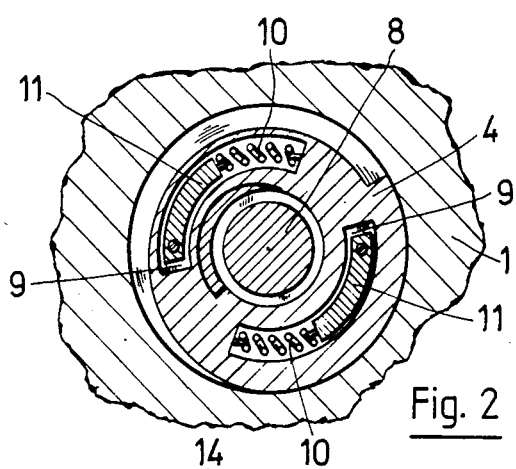
FIG. 2,illustrates a cross sectional view taken on line II—II of FIG. 1.

Referring to FIGS. 1 and 2, the end face of the lower bolt part 4 is formed with two ring sector recesses 9 each of which receives a means to permit relative rotation between the parts 4, 5. As indicated, the means is in the form of a pair of springs 10 each of which bears at one end on an end surface of a recess 9 and at the other end on an abutment 11 which is also disposed in the recess 9. Each abutment 11 is operatively connected to the upper bolt part 5 by way of a pin 12 which extends through the bolt part 5 and parallel to the length or longitudinal axis of the bolt 2. As also shown in FIG. 1, the bolt parts 4, 5 are separated by a gap 13.

The connection operates as follows. When the bolt 2 is threaded into the component 1, the screw threading 3 of the upper part 5 engages first. When the junction between the bolt parts 4, 5 enters the tapping or internal screw threading of the component 1, the two bolt parts 4, 5 take up a position relative to one another so as to maintain the gap 13. Thus, the external screwthread 3 is continuous from one bolt part 4 to the other bolt part 5 as illustrated in FIG. 1. In this condition, the bolt 2 can be threaded further into the tapped component 1 as desired. At this time, the transfer of force through the springs 10 maintains the gap 13.

That is, as a turning force is imposed on the lower bolt part 4, the turning force is transferred via the springs 10 onto the abutments 11 and, through the pins 12, to the upper bolt part 5 as viewed in FIG. 1. In this respect, the bolt parts 4, 5 rotate in counterclockwise manner as viewed in FIG. 2. When endeavours are made to unscrew the bolt 2 from the component 1, the bolt part 4 being turned clockwise as viewed in FIG. 2, the bolt parts 4, 5 are biased apart by the springs 10 so as to move relative to one another. The clockwise rotation of the bolt part 4 tends to unthread the bolt part 4 from the component 1 while at the same time causing the bolt part 5 to thread into the bolt part 4 via the screwthread 6 and thus to substantially close the gap 13. The continuity of the external screw threading 3 is therefore interrupted and the bolt cannot be turned in the sense of an unscrewing. Automatic release of the connection between the component 1 and the bolt 2 is therefore impossible.

When the screw connection is to be loosened, the bolt part 5 is rotated by means of the projecting ends 12 to restore the gap 13 and the bolt 2 is screwed out. As a rule, the pins 12 do not project from the bolt 5 as shown in FIG. 1 but terminate therein. In this case, a tool (not shown) which engages in the apertures for the pins 12 is used to restore the gap when a deliberate release of the connection is required.

Figure 3:
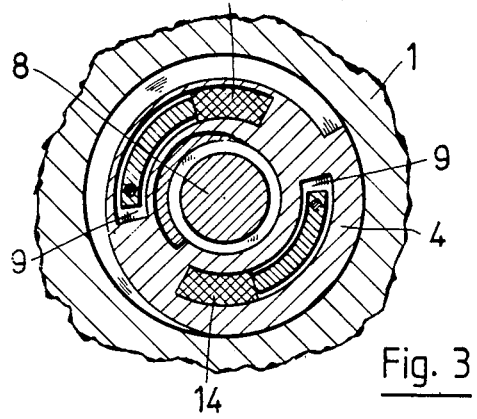
FIG. 3 illustrates a cross sectional view similar to FIG. 2 of a modified threaded connection in accordance with the invention.

Referring to FIG. 3, wherein like reference characters indicate like parts as above, the means to permit relative movement between the bolt parts 4, 5 is in the form of resiliently deformable rubber members 14 which are received in the recesses 9 instead of the helical springs 10.

Figure 5:
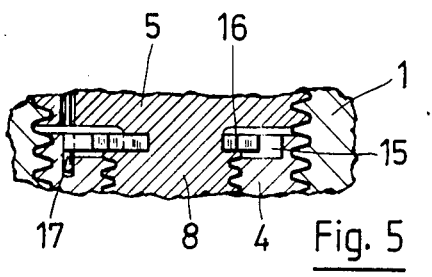
FIG. 5 illustrates an axial cross sectional view through the embodiment of FIG. 4 at the junction between the bolt parts.
Figure 4:
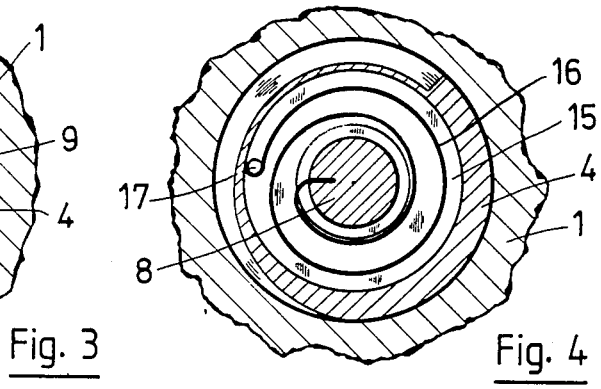
FIG. 4 illustrates a cross sectional view similar to FIG. 2 of a further modified embodiment of a threaded connection in accordance with the invention.

Referring to FIGS. 4 and 5, wherein like reference characters indicate like parts as above, instead of using two recesses 9 and two springs 10 as in FIG. 2, a single continuous circular recess 15 is provided in the bolt part 4 along with a single spiral spring 16 in the recess 15. In this case, the spring 16 has an inner end secured to the extension 8 of the bolt part 5 and the outer end secured to a pin 17 fixed to the outer periphery of the recess 15 in the bolt part 4.

The embodiments illustrated in FIGS. 3 to 5 operate in the manner described with reference to the embodiment of FIGS. 1 and 2.

Figure 6:
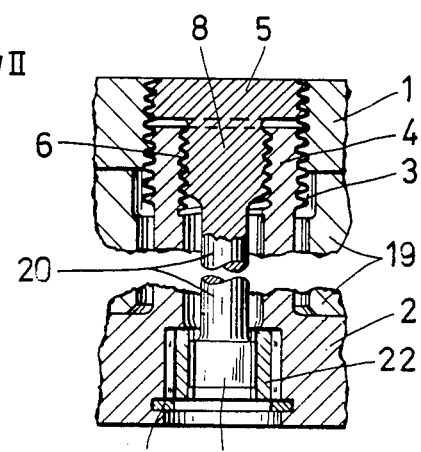
FIG. 6 illustrates an axial sectional view through a threaded connection having a torsion bar in accordance with the invention.

Referring to FIG. 6, wherein like reference characters indicate like parts as above, the bolt 2 may be in the form of a headed screw while the tapped component 1 is in the form of a nut. In this case, a component 19 is clamped between the head of the bolt 2 and the nut 1.

As above, the bolt 2 is sub-divided in the external screw threading 3 into two bolt parts 4, 5. The lower part 4 is hollow throughout of define a longitudinally disposed bore with an internal screw thread 6 therein. The other bolt part 5 has an externally threaded extension 8 which merges into a torsion bar 20 which extends through the bore in the part 4 to a point near the head of the bolt 2. The free end 21 of the torsion bar 20, the bottom end as shown in FIG. 6, is thickened and has a toothing which extends along the bolt axis and which the internal toothing of a collar 22 pushed over the thickened end 21 engages. The collar 22 also has an external toothing which extends axially and which cooperates with a corresponding toothing in the head of the bolt 2. A securing ring 23 prevents the collar 22 from dropping out of the head of the bolt 2. With this construction, there is some backlash between the toothing of the thickened end 21 and the cooperating toothing of the collar 22 in order to permit relative movement between the bolt parts 4, 5 at the junction.

As indicated in FIG. 6, the bolt 2 can be readily threaded into the nut 1 with a gap 13 being left between the parts 4, 5 at the junction. During this time, the torsion bar 20 experiences a reduced stressing. When the screwing-in force decreases, the biassing provided by the torsion bar 20 is such that the gap 13 between the parts 4, 5 at their junction substantially closes so that the external screw threading 3 becomes discontinuous. Thus, accidental release of the threaded connection is prevented.

For a deliberate release of the threaded connection, the bar 20 is turned in the stress-reducing direction by means of an appropriate tool (not shown) until the gap between the parts 4, 5 is restored at their junction and the external screw threading 3 is once again continuous. In this case, the bolt 2 can be unthreaded from the nut 1 so long as the gap remains.

Figure 7:
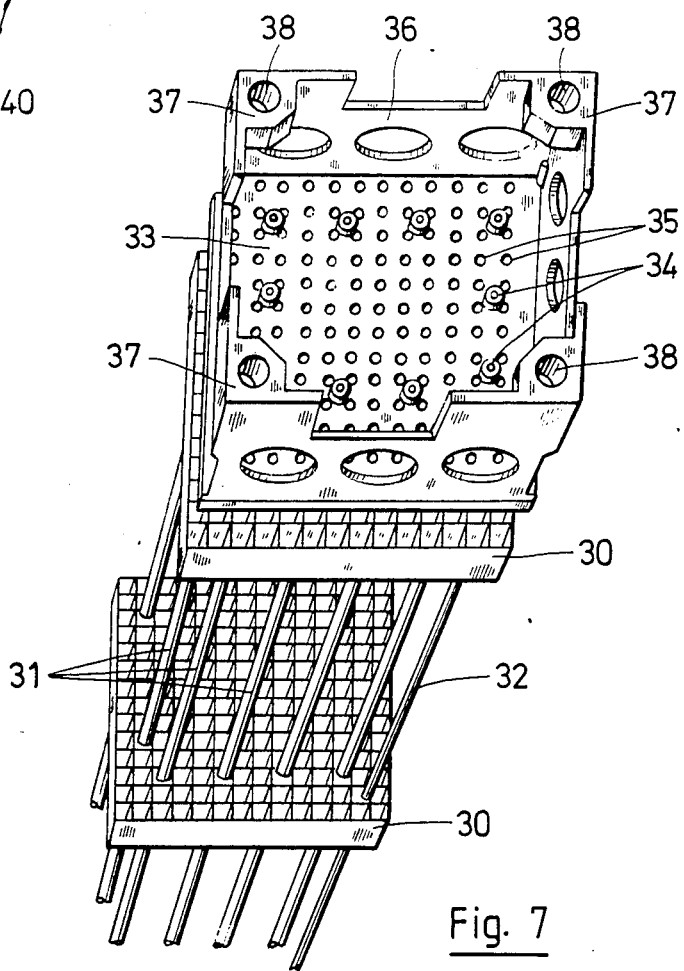
FIG. 7 illustrates a perspective partial view of a nuclear fuel element employing the bolts of the invention.

Referring to FIG. 7, wherein only the top part of a nuclear fuel element is illustrated, two spacing lattices 30 are shown, provided vertically one above another and a number of control rod guiding tubes 31 extend through the lattices 30. A plurality of fuel rods 32, only one of which is shown in FIG. 7, also extends through the lattices 30.

The guiding tubes 31 are connected at the top end via connections 34 to a square head plate 33. In addition to the connections 34, the head plate 33 has apertures 35 operative for the flow of coolant in connection with the fuel rods. The square plate 33 has a vertical collar 36 at the edge which has an inwardly extending flange 37 at each of four corners of the top edge. Each flange 37 is formed with a vertical guide bore 38.

Figure 8:
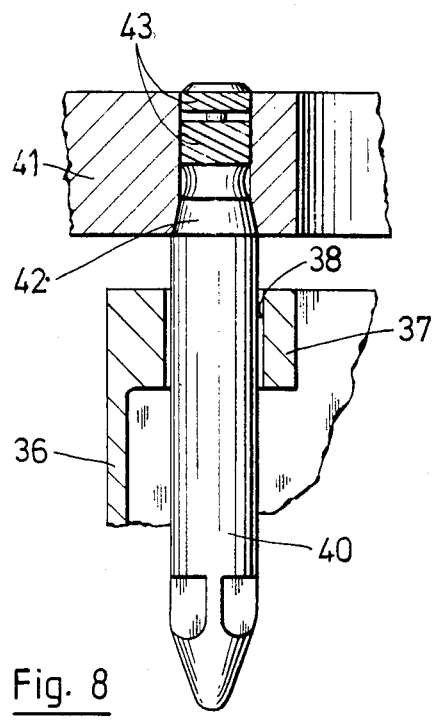
FIG. 8 illustrates an axial sectional view through a threaded connection associated with the fuel element of FIG. 7.

Referring to FIG. 8, a centering bolt 40 extends downwardly in any two diagonally opposite bores 38 of a fuel element and has a top end screwed into a lattice plate 41. The top end of the bolt 40 has an external screw thread 43 which, as described with reference to FIGS. 1 and 2, is subdivided into two parts while an internal screw thread in the plate 41 corresponds to the internal screw threading of the tapped component of FIG. 1. The bolt 40 can therefore be threaded into the plate 41 until a conical transition part 42 is engaged in the correspondingly shaped bore part of the plate 41. Thereafter, the threaded connection of the bolt 40 cannot be released accidentally.

The plate 41 is operative to locate the fuel elements in the core of a pressure water reactor.

Alternatively, the bolt can be constructed so that the bolt part 4 carries an extension with the external screw thread 6 while the other bolt part 5 is provided with a tapped aperture for receiving the threaded extension. Further, instead of using the helical springs 10 and rubber members 14, hermetically sealed air-filled or water-filled rubber cushions or the like may be used.

The invention thus provides a threaded connection which is constructed to reduce the risk of an accidental unthreading of the connection.

What is claimed is:

1. A threaded connection comprising
a tapped component; and
a bolt having a pair of externally threaded parts for threading into said tapped component, a screwthread threadably connecting said parts for relative rotation therebetween, one of said parts having a longitudinally disposed threaded bore and the other of said parts including a threaded extension threaded into said bore and having a torsion bar connected at one end to said one part at one end of said bore to permit relative movement between said parts whereby during threading of said bolt into said tapped component said parts move together to permit continuous threading and in response to unthreading of said bolt from said tapped component said parts move relative to each other to prevent removal of said bolt from said tapped component.

2. A threaded connection as set forth in claim 1 wherein said parts define a gap between the external threads of said parts wherein during unthreading of said bolt said parts move to close said gap.

3. A threaded connection as set forth in claim 2 wherein said screwthread is of opposite hand to the external thread of said parts.

4. A threaded connection as set forth in claim 1 wherein said screwthread has a different pitch from the external thread of said parts.

5. A threaded connection as set forth in claim 1 wherein said means is a spring.

6. A threaded connection as set forth in claim 1 wherein said torsion bar has a toothing at said one end thereof for securing said torsion bar to said one part.

* * * * *

UNITED STATES PATENT AND TRADEMARK OFFICE
CERTIFICATE OF CORRECTION

PATENT NO. : 4,690,600

DATED : Sept. 1, 1987

INVENTOR(S) : FREDY LAUER

It is certified that error appears in the above-identified patent and that said Letters Patent is hereby corrected as shown below:

```
In the Abstract, line 9 "part" should be -parts-
Column 1, line 42 "there between" should be -therebetween-
Column 2, line 45 "threaded" sholud be -threading-
Column 3, line 67 "of" should be -to-
```

Signed and Sealed this

Fifth Day of April, 1988

*Attest:*

DONALD J. QUIGG

*Attesting Officer*      *Commissioner of Patents and Trademarks*